April 16, 1935.  C. C. FARMER  1,998,276
FLUID PRESSURE BRAKE
Filed July 23, 1931   5 Sheets-Sheet 5
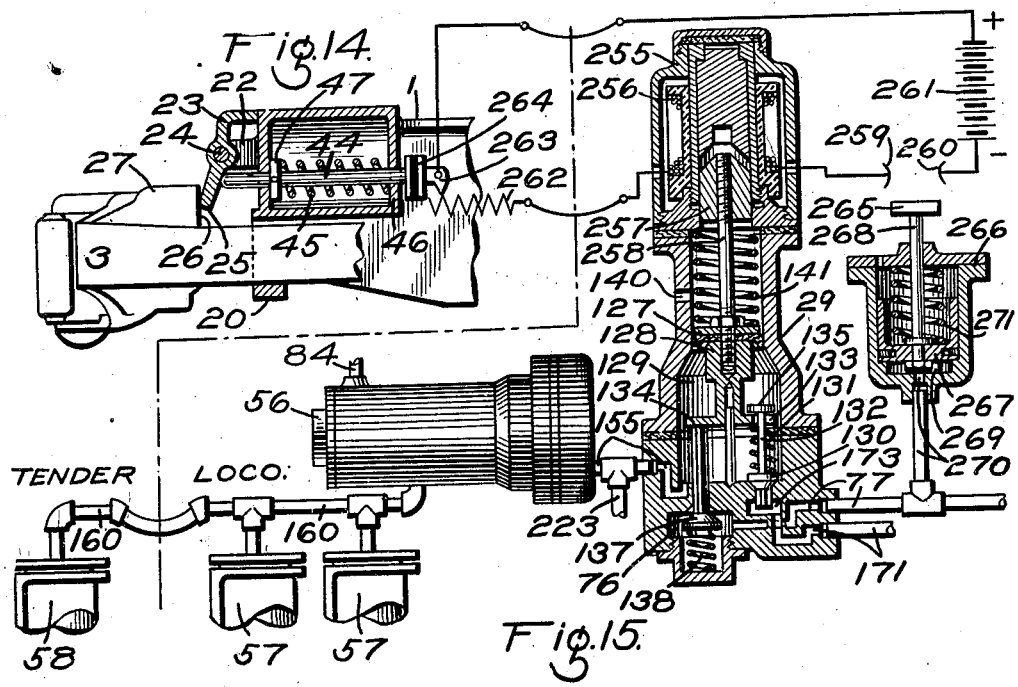
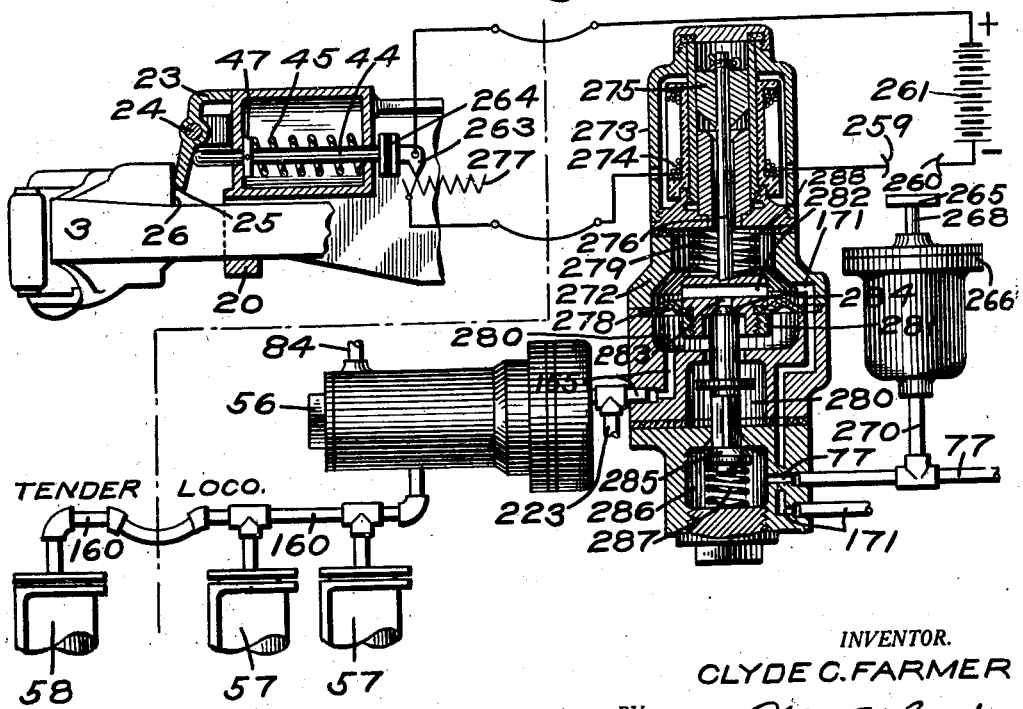
INVENTOR.
CLYDE C. FARMER
BY
ATTORNEY.

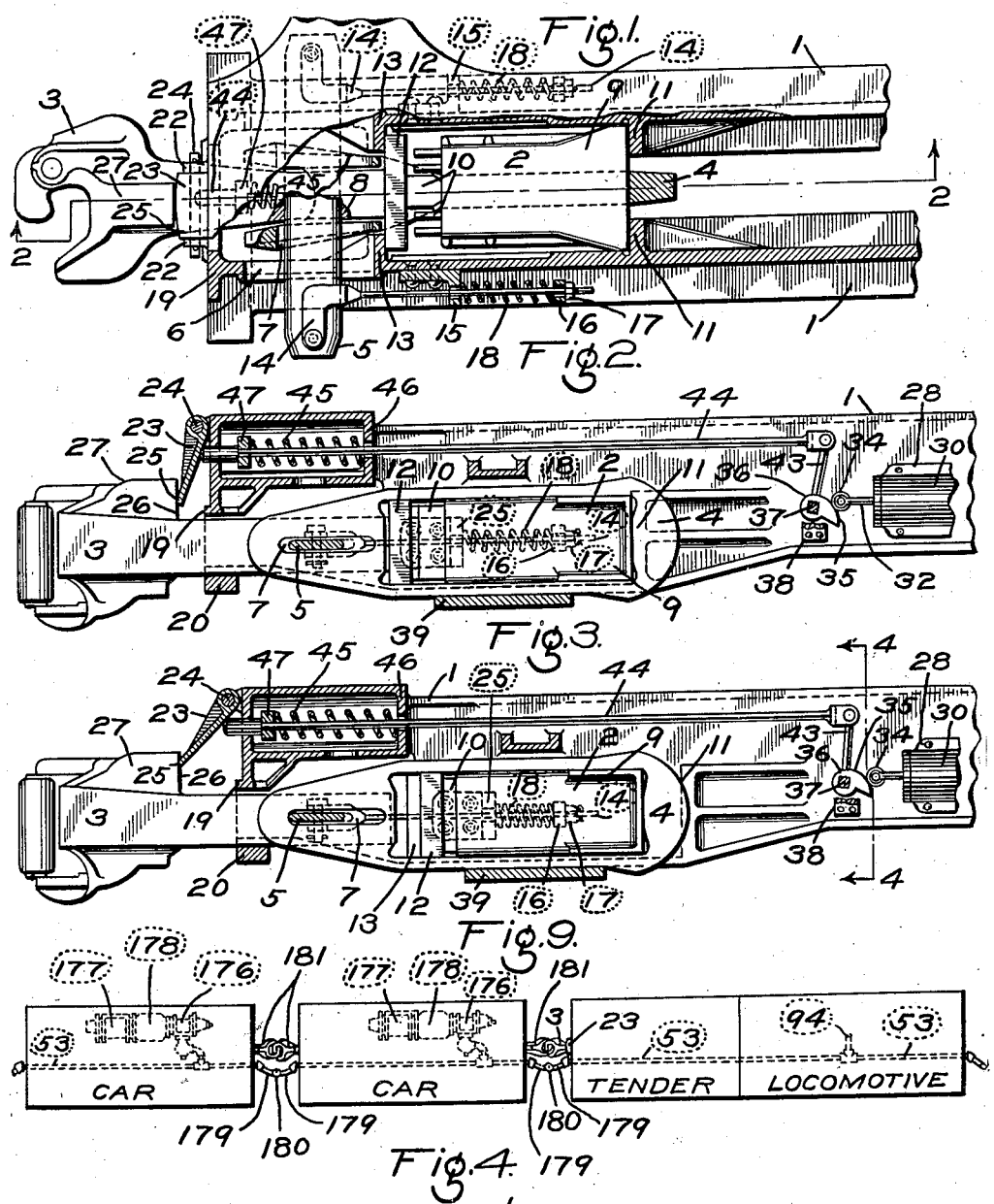

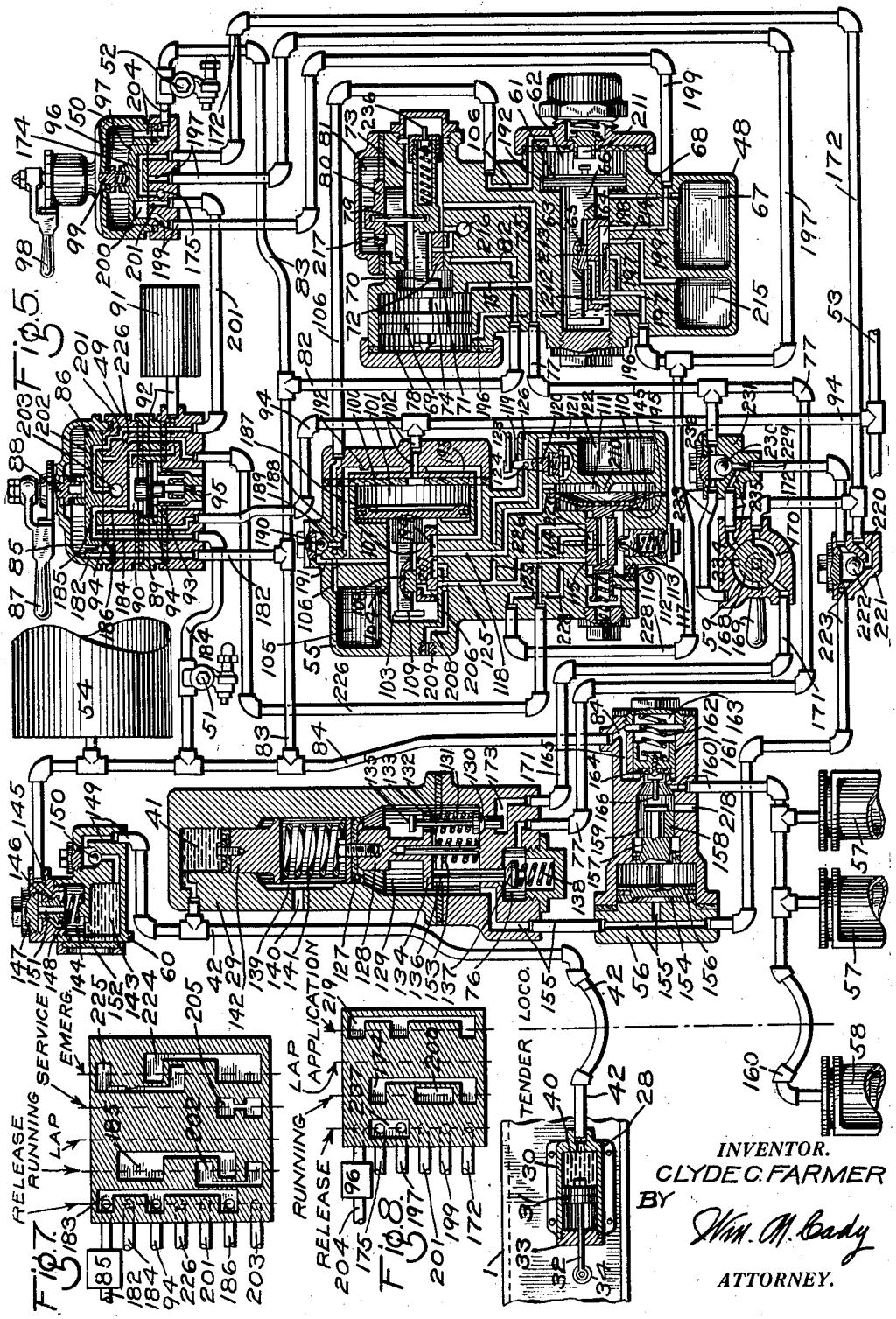

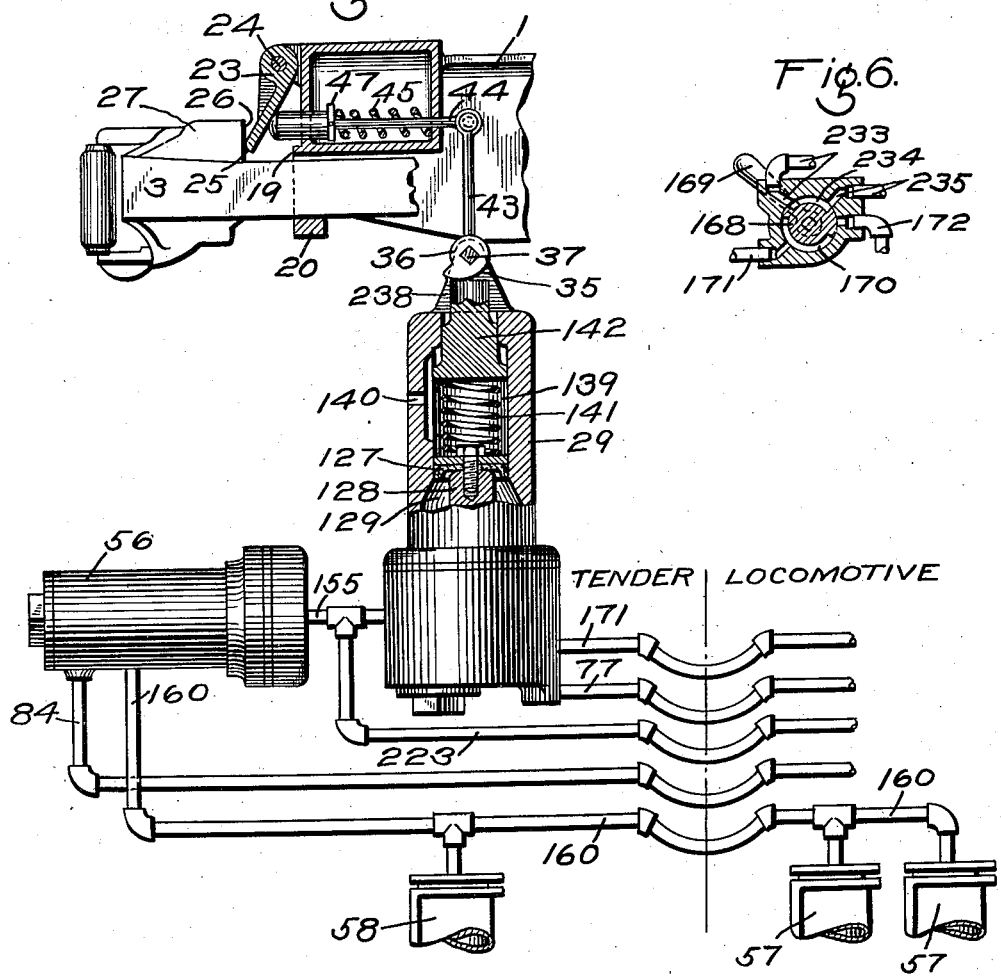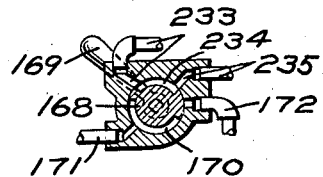

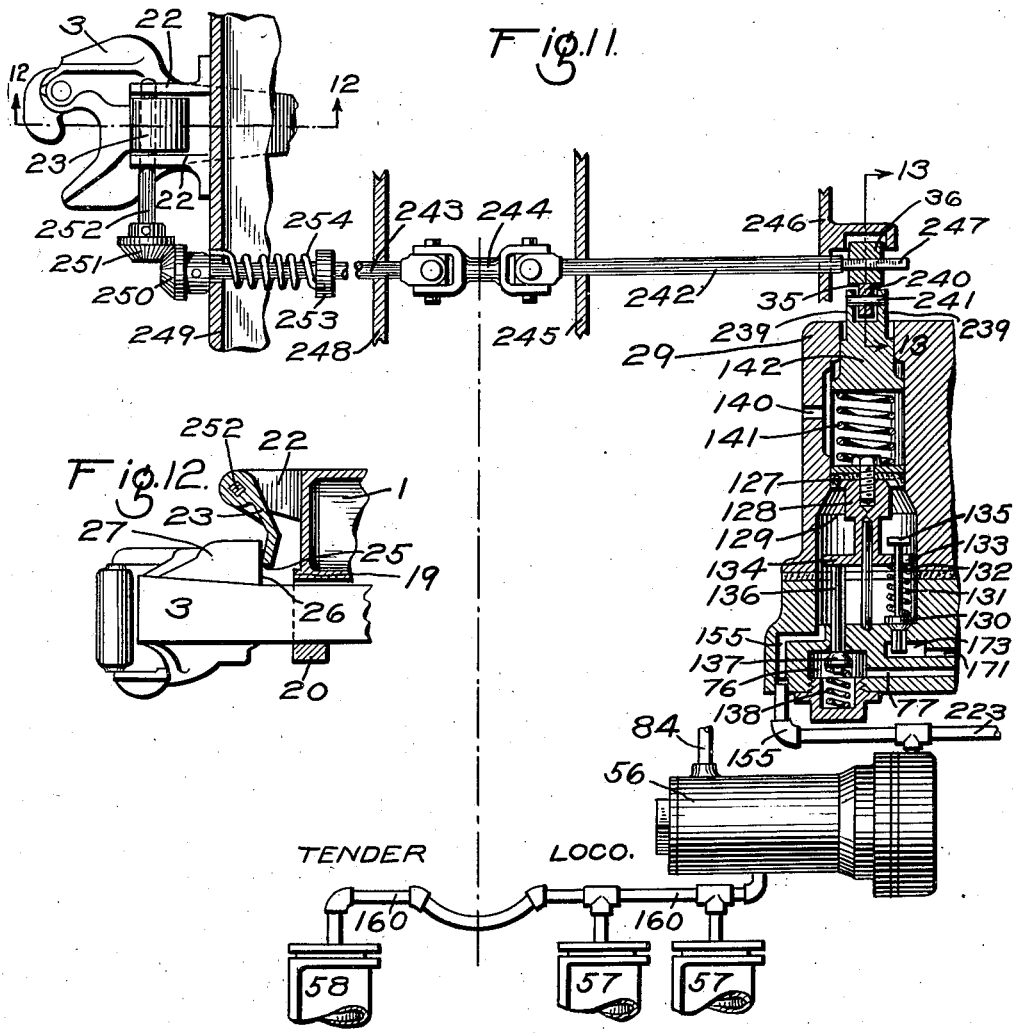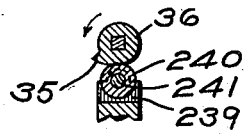

Patented Apr. 16, 1935

1,998,276

UNITED STATES PATENT OFFICE 1,998,276

FLUID PRESSURE BRAKE

Clyde C. Farmer, Pittsburgh, Pa., assignor to The Westinghouse Air Brake Company, Wilmerding, Pa., a corporation of Pennsylvania Application July 23, 1931, Serial No. 552,633

12 Claims. (Cl. 303—21)

This invention relates to brake systems for trains and more particularly to a fluid pressure brake system adapted for the handling of long trains.

It is well known that when the usual brake valve device of a fluid pressure brake system on a train is turned to a brake application position, the brakes apply serially from the front of the train toward the rear of the train, that is to say, the locomotive brakes will apply first and then the brakes on the following cars will apply serially toward the rear end of the train. As a result of this serial brake action the retardation of the locomotive and cars at the front end of the train begins before the brakes on the cars at the rear end of the train become effective.

There is a certain amount of slack or lost motion in the usual coupling mechanisms between the adjacent ends of adjacent cars of the train, and by reason of the fact, as above explained, that the locomotive and cars at the front end of the train begin to decelerate before the cars at the rear end of the train, if this slack is stretched out at the time an application of the brakes is initiated, the rear cars of the train run in against the slower moving cars and locomotive at the front end of the train, causing excessive shocks which may result in damage or derailment of some of the cars of the train.

To prevent this harsh slack gathering action on a train, means have been proposed for holding back or delaying the application of the locomotive brakes until such time as the slack in the train will have substantially gathered, so that the inertia of the locomotive, during this delay period, will tend to stretch out the gathering slack in the train. This hold-back feature is effective in that it does insure the gentle gathering of the slack in the train, but it has been found that after the slack in the train has gathered and an application of the locomotive brakes is effected, the cars of the train run in against the locomtive and cause excessive shocks.

The principal object of my invention is to provide an improved brake system for a train which, in functioning to effect an application of the brakes, will insure the stopping of the train without the occurrence of the above mentioned excessive and dangerous shocks.

Another object of my invention is to provide a brake system for a train, which, in functioning to effect an application of the brakes, will first insure the gentle gathering of the slack in the train and after the slack is gathered, prevent excessive shocks incident to the stopping of the train.

Another object of my invention is to provide a brake system for a train which, in functioning to effect an application of the brakes, controls the braking action on the front end of the train according to relative longitudinal movement between two front vehicles or units of the train, such for instance as a locomotive and the adjacent car of the train.

A further object of my invention is to provide a train brake system embodying means whereby, in effecting an application of the brakes, the locomotive brakes are so controlled automatically that the locomotive will not in any way act to retard or impede the forward motion of the cars of the train while the train is being brought to a stop.

A still further object of my invention is to provide a locomotive brake equipment having means automatically operative in effecting an application of the brakes, for controlling the braking action on the locomotive according to the relative longitudinal movement between the locomotive and a car connected thereto.

A more specific object of my invention is to provide a locomotive brake equipment having means automatically operative in effecting an application of the brakes, for controlling the braking action on the locomotive according to the action of a coupling mechanism carried by the locomotive.

Other objects and advantages will appear in the following more detailed description of the invention.

In the accompanying drawings; Fig. 1 is a plan view, partly in section, of a portion of the tender of a locomotive embodying a portion of one form of my invention, the coupling mechanism being shown in fully released position; Fig. 2 is a sectional view of the same taken on the line 2—2 of Fig. 1, some of the parts being shown in side elevation to more clearly illustrate certain details; Fig. 3 is a view similar to that of Fig. 2 except that it illustrates the several parts of the equipment in the positions they assume under maximum draft; Fig. 4 is a cross sectional view through one of the draft sills on the line 4—4 of Fig. 3; Fig. 5 is a diagrammatic view, mainly in section, of the portion of the brake system carried by the locomotive; Fig. 6 is a diagrammatic sectional view of a cut-out valve device, the valve thereof being shown in cut-out position; Figs. 7 and 8 are development views of the automatic brake valve device and independent brake valve device respectively; Fig. 9 is a diagrammatic view of a train comprising a locomotive and tender and two cars, only a portion of the brake system being shown; Fig. 10 is a diagrammatic view, partly in section, of a modification of the regulating mechanism of the brake system, the coupler being shown in the position it assumes under draft; Fig. 11 is a diagrammatic view of another modification of the regulating mechanism, the coupler being shown in the position it assumes when it is not subjected to draft strain; Fig. 12 is a longitudinal sectional view of the same taken on the line 12—12 of Fig. 11; Fig. 13 is a detail sectional view taken on the line 13—13 of Fig. 11, and Figs. 14 and 15 are diagrammatic views, partly in section, of two further modifications of the regulating mechanism.

As shown in Figs. 1 to 4 inclusive, the locomotive tender may comprise the usual spaced center or draft sills 1 which, as shown, may be integrally connected and which carry the usual coupling mechanism comprising a shock absorbing mechanism 2 disposed between the draft sills and also comprising a coupler 3 having its inner end or shank operatively connected with the shock absorbing mechanism through the medium of a draft yoke 4 and a horizontally disposed draft key 5, the yoke surrounding the shock absorbing mechanism and the key passing through slots 6, 7 and 8 formed in the draft sills 1, yoke 4 and coupler shank respectively.

The shock absorbing mechanism may be of any desired type, but for illustrative purposes only, is shown in the drawings as being of an ordinary friction type, which is briefly described as comprising a friction casing 9, having mounted therein at its forward open end, the usual friction controlling means 10. The rear end of the casing 9 is engaged by the rear end of the yoke 4 and is adapted to engage rear stop lugs 11 rigidly carried by the draft sills 1 and the forward end of the friction controlling means 10 engages the rear face of a follower plate 12 carried by the yoke 4, the front face of said plate being adapted to engage front stop lugs 13 carried by the draft sills 1 and is adapted to be engaged by the rear face of the coupler shank.

Secured to each end of the draft key 5 and extending rearwardly therefrom is a rod 14 which is slidably carried by the flange 15 of a member secured to the vertically disposed web of one of the draft sills 1. The rear end of this rod is provided with a follower plate 16 and a nut 17 which has screw-threaded connection with the rod and maintains the plate on the rod. Surrounding the rod 14 and interposed between and engaging the flange 15 and plate 16 is a spring 18. The springs 18 are of such value that, when the shock absorbing mechanism is relieved of pulling strains and is fully released as shown in Figs. 1 and 2, they act, through the medium of the rods 14 and draft key 5, to maintain the end of the coupler shank in engagement with the follower plate 16. It will here be understood the combined force of the springs 18 is not sufficient to compress the shock absorbing mechanism 2 or to materially affect the capacity of said mechanism.

At the end of the tender a striking plate 19 is provided which, as shown in Figs. 1 to 3 inclusive, may be integral with the draft sills 1. Located below the striking plate and carried by the draft sills is the usual carry iron 20 which supports the coupler shank and thereby the coupler 3. The draft yoke 4 and shock absorbing mechanism are supported from the draft sills in the usual manner, by a horizontally disposed plate 39 which is secured at its ends to the bottom flanges of the sills.

Above the coupler shank, the striking plate is provided with outwardly extending laterally spaced lugs 22, between which a member 23 is pivotally mounted on a pin 24 extending between and carried by the lugs 22. The member 23 extends some distance below the pin 24 and its lower edge portion 25 is engaged by the rear face 26 of the usual coupler horn 27, said edge portion 25 being preferably curved as shown in Fig. 1.

A control device 28, which is for the purpose of adjusting a regulating valve device 29, is secured to the vertically disposed web of one of the draft sills and comprises a cylinder 30 containing a plunger piston 31 having a stem 32 extending through the non-pressure head 33 of the cylinder. The outer end of this stem is provided with a roller 34 which is constantly in engagement with the cam surface 35 of a cam 36 secured to a shaft 37 rotatably mounted in one of the draft sills and a bracket 38 secured to the sill.

At one side of the plunger piston 31 there is a chamber 40 which is filled with a suitable liquid such as oil or the like and which is connected to a chamber 41 in the regulating valve device 29 through a pipe connection 42, said chamber 41 and pipe connection 42 being also filled with liquid.

Since the chamber 40, pipe connection 42 and chamber 41 are completely filled with liquid, forward movement of the plunger will displace liquid from the chamber 40 and pipe 42 into the chamber 41, the position of the plunger piston being governed by the position to which the cam is rotated. When the cam is rotated in a counter-clockwise direction, the plunger piston 31 is forced forwardly and when the cam is rotated in the opposite direction, the liquid in the chamber 41 will, as hereinafter described, be displaced into the pipe 42 and chamber 40.

For the purpose of rotating the cam 36, an operating arm 43 is provided which is secured to the cam operating shaft 37. The outer end of this arm is pivotally connected to the inner end of a plunger rod 44 which is located between the draft sills. The outer end of the plunger rod extends through an opening in the striking plate into operative engagement with the rear face of the pivoted member 23 and is yieldably maintained in such engagement by a spring 45 which is interposed between and engages an abutment 46 formed integral with the draft sills and a collar or abutment 47 carried by the plunger rod.

The foregoing description has for the most part been limited to the parts of the brake system which are carried by the tender and a description of the parts carried by the locomotive now follows.

The locomotive brake equipment, besides having the regulating valve device 29, also comprises, as shown in Fig. 5, a distributing valve device 48, an automatic brake valve device 49, an independent brake valve device 50, a feed valve device 51, a reducing valve device 52, a brake pipe 53, a main reservoir 54, a hold back valve device 55, a relay valve device 56 which is operative to supply fluid under pressure to and to release fluid under pressure from the brake cylinders 57 on the locomotive and the brake cylinder 58 on the tender, a cut-out valve device 59 and a liquid reservoir device 60.

The distributing valve device may comprise an equalizing portion and an application portion. The equalizing portion comprises a piston 61 having at one side a chamber 62 and at the other side a valve chamber 63 containing a main slide valve 64 and an auxiliary slide valve 65 adapted to be operated by the stem 66 of the piston 61. The valve chamber 63 is in constant communication with a pressure chamber 67 through a passage 68. The application portion comprises a piston 69 having a stem 70 which carries a baffle piston 71, said stem being adapted to operate an exhaust slide valve 72 contained in a valve chamber 73 at one side of the baffle piston 71, which valve chamber is connected to a chamber 74 between the piston 69 and the baffle piston 71 through passages 75 which lead to a valve chamber 76 in the regulating valve device through a pipe 77. At the other side of the piston 69 there is a chamber 78. Secured to and extending upwardly from the piston stem 70 is a driving pin 79 which operatively engages an application supply valve 80 contained in a chamber 81 constantly connected to the main reservoir 54 through a passage and pipe 82 and pipes 83 and 84.

The automatic brake valve device 49 may comprise a casing having a chamber 85 containing a rotary valve 86 adapted to be turned to various brake controlling positions by a handle 87 operatively mounted on the stem 88 of the rotary valve. The usual brake pipe discharge valve mechanism is disposed in the brake valve casing and comprises an equalizing piston 89 having at one side a chamber 90 which is connected to an equalizing reservoir 91 through a passage and pipe 92. At the other side of the piston 89 there is a chamber 93 which is connected to the brake pipe 53 through a passage and pipe 94, said chamber 93 containing a brake pipe discharge valve 95 adapted to be operated by the piston 89.

The independent brake valve device 50 may be of the usual type and comprises a casing having a chamber 96 containing a rotary valve 97 adapted to be turned to various locomotive brake controlling positions by a handle 98 operatively mounted on the stem 99 of the rotary valve.

In the usual locomotive brake equipment, the distributing valve device 48 operates in accordance with variations in brake pipe pressure, but in the present brake system and as shown in Fig. 5 of the drawings, the hold-back valve device 55 controls its operation, as will appear later in this description.

The hold-back valve device 55 comprises a control portion and a timing portion contained in a casing.

The control portion of the hold back valve device comprises a piston 100 having at one side a chamber 101 connected to the brake pipe 53 through a passage and pipe 102 and pipe 94, and having at the other side a valve chamber 103 connected to the equalizing piston chamber 62 of the distributing valve device 48 through a passage 104, a volume reservoir 105, and passages and pipe 106. The valve chamber 103 contains a main slide valve 107 and an auxiliary slide valve 108, both of which are adapted to be operated by the stem 109 of the piston 100.

The timing portion of the hold-back valve device comprises a flexible diaphragm 110 mounted in the casing and having at one side, a chamber 111 and at the other side, a valve chamber 112, which is in constant communication with the atmosphere through a choke plug 113. The chamber 112 contains a stem 114 for shifting a slide valve 115 also contained in the chamber, the stem being movable in one direction by the diaphragm 110 against the opposing pressure of a spring-pressed plunger 116 and movable in the opposite direction by the action of said plunger. The slide valve 115 is urged into close engagement with its seat by means of a spring-pressed roller 117.

The diaphragm chamber 111 of the timing portion of the hold-back device 55 is open to the seat of the main slide valve 107 of the control portion through a passage 118. The passage 118 has a branch leading to a plug valve 119, said plug valve having a passage 120 therethrough which, when the valve is in its normal position, as shown in Fig. 5, connects the branch of the passage 118 to a passage 121 leading to a timing reservoir 122. By rotating the plug valve 90° through the medium of a handle 123, the communication from the passage 118 to the passage 121 is closed off and a passage 124, through the valve connects a passage 125 leading from the seat of the main slide valve 107 with a passage 126 open to the atmosphere. With the plug valve in the first mentioned position, the hold-back device 55 is cut into operation and with the plug valve in its other position the hold-back device is cut out of operation.

The regulating valve device 29 may comprise a casing in which a piston 127 is operatively mounted, said piston having a stem 128 contained in a chamber 129 at one side of the piston. Also contained in the chamber 129 is a release valve 130 which is urged toward its seat by the action of a coil spring 131 which is interposed between the inner end of the piston stem 128 and the valve. This valve is provided with a stem 132 which extends through a slotted opening 133 formed in a flange 134 of the piston stem and at its end is provided with an enlargement or head 135 with which the flange 134 is adapted to engage to unseat the valve. The opening 133 is made large enough to permit the piston stem 128 to move freely relative to the valve stem 132 until such time as the flange 134 engages the head 135 of the stem. The inner end of the piston stem 128 is adapted to engage the end of a fluted stem 136 of a fluid pressure supply valve 137 which is contained in the valve chamber 76 and which is urged toward its seat by the action of a coil spring 138.

At the other side of the regulating piston 127 there is a chamber 139 which is open to the atmosphere through a passage 140 and which contains a regulating spring 141. The spring 141 is interposed between and engages one side of the piston 127 and the inner end of a piston plunger 142 slidably mounted in the casing and which is subject to the pressure of the liquid in the chamber 41. It will here be noted that the piston 127, through the medium of the stem 128 controls the operation of the release and supply valves 130 and 137 and that the spring 141 controls the operation of the piston in accordance with the operation of the plunger piston 142.

The liquid reservoir device 60 is provided for the purpose of maintaining filled with liquid the chambers 40 and 41 of the control device 28 and regulating valve device 29 respectively and the pipe connection between these chambers. This reservoir device may comprise a casing having a liquid storage chamber 143 which is open to a fluid pressure chamber 144 to which the main reservoir 54 is connected through the main reservoir pipe 84, a passage 145 in the casing, and past a valve 146 which is normally maintained unseated by a cap nut or filling plug 147 having screw-threaded connection with the casing. Contained in the chamber 144 and interposed between and engaging the casing and the valve 146 is a spring 148 which at all times tends to seat the valve 146.

The storage chamber 143 is connected to the pipe connection 42 and consequently to the liquid chambers 40 and 41 through a passage and pipe 149. A ball check valve 150 is interposed in the passage 149 and is provided for the purpose of preventing back flow of liquid from the pipe connection 42 to the liquid storage chamber 143. The valve 146 has a central bore 151 through which liquid is adapted to be supplied to the chamber 143 by way of the chamber 144 when the cap nut 147 is removed from the casing. When the cap nut is being removed, the spring 148 acts to seat the valve 146 before the cap is free of the casing, thus closing the communication from the main reservoir 54 to the chamber 144. With this communication closed, there will be no loss of fluid under pressure from the main reservoir when the cap nut is removed. Mounted in one end of the casing is a transparent window 152 through which the level of the liquid in the storage chamber 143 can be seen.

It will be understood that instead of connecting the chamber 144 of the oil reservoir device 60 directly to the main reservoir 54 as before described, it may be connected to any other desired fluid pressure supply pipe or source.

Interposed between and engaging the inner end of the piston stem 128 and the casing of the regulating valve device 29 is a coil spring 153 which acts on the piston stem 128 to balance the pressure of the liquid in the chamber 41 acting on the plunger piston 142 when the liquid is subject to the pressure of fluid from the main reservoir or any other source.

The relay valve device 56 is for the purpose of controlling the supply of fluid under pressure to and the release of fluid under pressure from the brake cylinders 57 and 58 and its operation is adapted to be normally controlled by the regulating valve device 29 and by the independent brake valve device 50 as will hereinafter more fully appear. This relay valve device may comprise a casing having a chamber 154 which is connected to the chamber 129 in the regulating valve device 29 by way of passages and pipe 155 and containing a piston 156 having a stem 157 adapted to operate a slide valve 158 contained in a chamber 159 which is constantly connected to the brake cylinders 57 and 58 through a passage and pipe connection 160. Mounted in the casing is a piston valve 161 which is subject on one side to the pressure of a coil spring 162 contained in a chamber 163 and also to the pressure of fluid present in this chamber as supplied from the main reservoir 54 through the main reservoir pipe and passage 84. The piston valve is provided at the other side with a valve 164 which is adapted to seat on an annular seat rib carried by the casing, the outer seated area of the valve being connected to the passage 84 through a passage 165. The piston valve is also provided with a projection 166 which extends into the valve chamber 159 and is there adapted to be engaged by the rear end of the piston stem 157.

The cut-out valve device 59 is provided for the purpose of rendering the regulating valve device either effective or ineffective to control the supply of fluid under pressure to and the release of fluid under pressure from the piston chamber 154 in the relay valve device 56 and to provide for the direct control of the relay valve device by the application portion of the distributing valve device 48. This valve device 59 may comprise a casing in which a plug valve 168 is rotatably mounted, said valve being adapted to be rotated by means of a handle 169. In Fig. 5 the plug valve 168 is shown in its normal or cut-in position, in which a cavity 170 establishes communication from an exhaust pipe 171 to an exhaust pipe 172, the pipe 171 leading from an exhaust chamber 173 in the regulating valve device and the pipe 172 leading to the independent brake valve device 50 where, with said brake valve device in running position, as shown in Fig. 5, said pipe 172 is connected to the atmosphere by way of a cavity 174 in the rotary valve 97 and an exhaust passage 175.

In Fig. 6 of the drawings, a train is diagrammatically illustrated in which the locomotive and tender are equipped with the brake equipment just described and in which each car is equipped with the usual well known brake equipment comprising a triple valve device 176, a brake cylinder 177 and an auxiliary reservoir 178. Each triple valve device is connected to the brake pipe 53 which is, in effect, continuous from end to end of the train, the brake pipe of each unit of the train being connected to the brake pipe of an adjacent unit by the usual flexible hose 179 and hose couplings 180.

The foregoing description has, for the greater part been directed to the detailed construction and arrangement of the several parts of the brake system and the following description will be directed particularly to the operation of these parts.

Assuming the coupler 3 at the rear end of the tender to be coupled to the coupler 181 at the front end of the first car of a train of coupled cars and the brake pipes of the several units of the train to be coupled, all as shown in Fig. 6, the operation of the several parts of the system is as follows.

In initially charging the fluid pressure brake system, fluid under pressure supplied to the main reservoir 54 by a fluid compressor in the usual well known manner, flows to the valve chamber 81 in the application portion of the distributing valve device 48 through pipes 84, 83 and pipe and passage 82. From the pipe 84 fluid flows to the feed valve device 51, to the pressure chamber 144 in the liquid reservoir device 60 by way of passage 145, to the chamber 163 in the relay valve device 56 and to the outer seated area of the relay piston valve 164 by way of passage 165. From the pipe 83 fluid under pressure flows to the reducing valve device 52 and also flows to the rotary valve chamber 85 of the automatic brake valve device 49 through a pipe and passage 182.

In charging the system with fluid under pressure, the rotary valve 86 of the automatic brake valve device 49 is rotated by the engineer to release position, in which a port 183 in the rotary valve and open to the rotary valve chamber registers with the brake pipe passage 94 and a passage 186 open to the equalizing piston chamber 90 in the brake valve device. With the port 183 in registration with the passage 94, fluid under pressure supplied from the main reservoir 54 to the rotary valve chamber 85 flows directly to the brake pipe 53 thus insuring the rapid charging of the brake pipe. Fluid under pressure flows from the passage 94 to the chamber 93 at one side of the equalizing piston 89 of the brake valve device and at the same time fluid under pressure flows from the port 183 to the chamber 90 at the other side of the equalizing piston by way of passage 186. From the chamber 90 fluid under pressure flows to the equalizing reservoir 91 through passage and pipe 92. The pressures of fluid in the chambers 90 and 93 increase at substantially the same rate so that the force of gravity maintains the exhaust valve 95 seated. After a predetermined period of time has elapsed, the engineer rotates the rotary valve 86 from release position to running position, as shown in Fig. 5, in which position fluid under pressure is supplied in the usual manner from the feed valve device 51 to the brake pipe 53 by way of a pipe and passage 184, a cavity 185 in the rotary valve and passage and pipe 94. Fluid under pressure supplied to the passage 94 flows to the chamber 93 at one side of the brake valve equalizing piston and fluid under pressure from the cavity 185 flows to the chamber 90 at the other side of the piston and to the equalizing reservoir and the exhaust valve 95 is maintained seated.

The feed valve device 51 is adapted to reduce the pressure of fluid from that carried in the main reservoir 54 to that normally carried in the brake pipe and since, with the brake valve device 49 in running position, fluid is supplied from the feed valve device to the brake pipe, said brake pipe and the chambers above mentioned, as well as the chambers in each car equipment which are open to the brake pipe, are finally charged with fluid at feed valve pressure in the usual manner.

Fluid at feed valve pressure supplied to the pipe 94 also flows through pipe and passage 102 to the control piston chamber 101 in the holdback valve device 55. With the control piston 100 and slide valves 107 and 108 in their inner position, as shown in Fig. 5, fluid under pressure flows from the chamber 101 to the control slide valve chamber 103 through a passage 187, a choke 188, a passage 189, past a ball check valve 190 and through a passage 191. From the valve chamber 103 fluid under pressure flows through the passage 104 to the volume reservoir 105 and from said reservoir flows to the equalizing piston chamber 62 of the distributing valve device 48 through passages and pipe 106. With the equalizing piston 61 in its inner or release position, as shown in Fig. 5, a feed groove 192 is open around the piston so that fluid under pressure supplied to the piston chamber 62 flows through the feed groove to the valve chamber 63 and from thence flows to the pressure chamber 67 through passage 68. The control piston chamber 101, control valve chamber 103, volume reservoir 105, equalizing piston chamber 62, equalizing valve chamber 63 and pressure chamber 67 are thus charged with fluid at brake pipe pressure.

With the control piston 100 and slide valves 107 and 108 of the hold back valve device 55 in their inner position, as shown in Fig. 5, fluid under pressure from the passage 187 flows to the timing reservoir 122 by way of a choke 192, a branch passage 193, a cavity 194 in the slide valve 107, passage 118, passage 120 in the plug valve 119 and passage 121. Fluid under pressure thus supplied to the passage 118 also flows to the timing valve diaphragm chamber 111. The timing reservoir 122 and the diaphragm chamber 111 are thus charged with fluid at brake pipe pressure. The pressure of fluid in the diaphragm chamber 111 causes the diaphragm to deflect in the direction toward the left hand, shifting the stem 114 and slide valve 115 in the same direction against the opposing pressure of the spring-pressed member 116 until such time as the several parts are brought to a stop by a follower 195 on the stem engaging the casing, as shown in Fig. 5.

With the automatic brake valve device 49 and the independent brake valve device 50 in running position and the equalizing piston 61 and slide valves 64 and 65 in their normal or release position, all as shown in Fig. 5, the application piston chamber 78 is open to the atmosphere through a passage 196, a passage 197, a cavity 198 in the slide valve 64, passages and pipe 199, a cavity 200 in the rotary valve 97 of the independent brake valve device 50, passages and pipe 201, a cavity 202 in the rotary valve 86 of the automatic brake valve device 49 and an exhaust passage 203.

Fluid at the pressure governed by the adjustment of the reducing valve device 52 is supplied to the rotary valve chamber 96 of the independent brake valve device 50 through a pipe and passage 204.

Assuming the train brake system to be fully charged as just described, the several parts of the tender coupling mechanism in release position and the several parts of the brake system in release position, all as shown in Figs. 1, 2 and 5, the cam 36 holds the piston 31 in the position in which it is shown in Fig. 5. In such position, the piston 31 maintains sufficient pressure on the liquid in chambers 40 and 41 in the control device 28 and regulating valve device 29 respectively, and consequently on the plunger piston 142, regulating spring 141, piston 127 and piston stem 128, to maintain the supply valve 137 of the regulating valve device unseated against the opposing pressure of the spring 138 and against the opposing pressure of the spring 131 which maintains the exhaust valve 130 seated.

When the locomotive and tender move forwardly, that is, in the direction toward the right hand, in setting the train in motion, the draft sills 1 of the tender move relative to the coupler 3 until such time as the cars of the train are in motion. As the draft sills thus move, the shock absorbing mechanism 2 and follower plate 12 of the coupling mechanism and draft yoke 4 of the coupling mechanism all move with them relative to the coupler 3 until such time as portions of the draft yoke, at the front end of the key slots 7, engage the front edge of the draft key 5 as shown in Fig. 3. It will here be understood that while the initial movement of the shock absorbing mechanism, follower plate and draft yoke is being effected by the draft sills as just described, the coupler 3, its shank, the draft key 5, rods 14 which are secured to the ends of the draft key and spring follower plates 16 on the rods, will be held stationary due to the resistance to forward movement offered by the stationary cars of the train and due to this, the flanges 15 moving with the draft sills will cause the springs 18 to be compressed, the power of the springs when so compressed being insufficient to impart movement to the cars of the train.

As the initial movement just described is taking place, the lower curved edge portion 25 of the pivoted member 23 is maintained in operative engagement with the rear face 26 of the coupler horn 27 by the pressure of the compressed spring 45 transmitted to the member through the medium of the plunger rod 44. When the draft sills 1 are moving forwardly, i. e., toward the right hand, the rod 44, due to the pressure of the spring 45, remains stationary relative to the sills and the inner end of the rod consequently forms a stationary fulcrum for the upper end of the cam operating arm 43, so that as the cam shaft 37 and cam 36 move with the sills they will be caused to rotate in a counter-clockwise direction from the position in which they are shown in Fig. 2 to the position in which they are shown in Fig. 3. The cam as it is thus moved forces the piston 31 of the control device 28 in the direction toward the right hand, said piston acting to displace liquid from the chamber 40 and thereby from the pipe connection 42 into the chamber 41 in the regulating valve device, which liquid acts to force the plunger piston 142 inwardly further compressing the regulating spring 141, the spring being initially compressed when the cam 36 is in the position as shown in Fig. 2.

When the initial movement of the several parts of the tender coupling mechanism has taken place, that is to say, when the front edge of the draft key has engaged the draft yoke 4, the further forward movement of the draft sills will cause the shock absorbing mechanism 2 to be compressed in the usual well known manner until such time as the cars of the train are in motion. As the draft sills 1 are thus further moved, the striking plate 19 moves further away from the rear face 26 of the coupler horn 27, the rod 44, which is subject to the pressure of the spring 45, acts to maintain the member 23 in operative engagement with the rear face 26 of the coupler horn. In Fig. 3 several parts of the coupling mechanism on the tender and the several parts of the brake system associated therewith have been shown in the positions which they may assume under heavy draft strains.

With the train in motion, the coupling mechanism on the tender in the position as shown in Fig. 3 and the brakes on the train released, and it is desired to effect a service application of the brakes, the engineer, by the use of the handle 87 rotates the rotary valve 86 of the automatic brake valve device 49 to service position in which the brake pipe passage 94 is lapped by said valve, so as to prevent further flow of fluid under pressure from the feed valve device 51 to the brake pipe 53. With the rotary valve in this position, the equalizing piston chamber 90 in the brake valve device and connected equalizing reservoir 91 are connected to the atmosphere through passage 186, a cavity 205 in the rotary valve 86 and the atmospheric passage 203, thereby permitting the pressure of fluid in the piston chamber 90 and reservoir 91 to reduce below the brake pipe pressure in the chamber 93 at the under side of the equalizing piston 89. Upon such a reduction in the pressure of fluid in the chamber 90, the fluid at brake pipe pressure present in chamber 93 causes the equalizing piston 89 to move upwardly and unseat the brake pipe discharge valve 95. With the valve 95 thus unseated, fluid under pressure flows from the brake pipe 53 through pipe and passage 94, chamber 93 in the brake valve device and past the open valve 95 to the atmosphere.

As the pressure of fluid in the brake pipe 53 is thus reduced, a corresponding reduction occurs in the control piston chamber 101 of the hold-back valve device 55 with the result that the pressure of fluid in the control valve chamber 103 shifts the control piston 100 and thereby the slide valves 108 and 107 to their outer or application position. During the travel of the piston the auxiliary slide valve 108 is first moved relative to the main slide valve 107 and uncovers a port 206 in the main slide valve, then both slide valves are moved to their outer position in which the port 206 registers with the passage 125 leading to the seat of the timing slide valve 115, said passage being normally lapped by the valve 115.

Further, with the main slide valve 107 in its outer position, a cavity 207 in this slide valve connects the passage 118 leading from the timing reservoir 122 and timing diaphragm chamber 111, to a passage 208 which is open to the atmosphere through a choke plug 209. With this connection made, fluid under pressure gradually flows from the diaphragm chamber 111 and timing reservoir 122 to the atmosphere, the rate of flow being governed by the flow area of the passage through the choke plug 209. When the pressure of fluid in diaphragm chamber 111 has been reduced to a predetermined degree, the spring-pressed member 116 acts to shift the stem 114 and slide valve 115 to their outer or application position, the stem flexing the diaphragm outwardly until all are brought to a stop by the diaphragm engaging a stop lug 210 formed on the casing.

With the slide valve 115 in its outer position, the passage 125 is open to the valve chamber 112 of the timing portion and as a result fluid under pressure flows from the equalizing piston chamber 62 in the distributing valve device to the atmosphere by way of passage and pipe 106, volume reservoir 105, passage 104, control valve chamber 103 of the hold-back valve device 55, port 206 in the main slide valve 108, passage 125, slide valve chamber 122 in the timing portion and choke plug 113. The flow area of the passage through the choke plug 113 is such as to provide for the reduction in the pressure of fluid in the equalizing piston chamber 62 at a service rate. Upon thus reducing the pressure of fluid in the equalizing piston chamber 62, the fluid under pressure in the equalizing valve chamber 63 acts to shift the equalizing piston 61 and thereby the slide valves 65 and 64 to their service position, i. e., to the position in which the piston 61 is brought to a stop by its engagement with a spring-pressed stop 211. As the piston 61 is being moved to service position, it shifts the auxiliary slide valve 65 relative to the main slide valve 64 and uncovers a port 212 in the main slide valve, and then shifts both slide valves to service position in which the port 212 registers with a passage 197. Fluid under pressure in the valve chamber 63, as supplied from the pressure chamber 67 by way of passage 68, now flows to the piston chamber 78 of the application portion of the distributing valve device 48 through the port 212 in the main slide valve 64, passage 197 and passage 196. With the main slide valve 64 in service position, a cavity 213 in the slide valve connects the passage 197 to a passage 214 leading to a chamber 215 which is provided merely as an additional volume for the application piston chamber 78.

Fluid under pressure thus supplied to the application piston chamber 78 causes the application piston 69 to move to shift the slide valves 72 and 80 to their application position. The slide valve 72, in application position, laps an exhaust passage 216 leading to the atmosphere to which passage the chamber 73 is open when the slide valve 72 is in its outer position, as shown in Fig. 5. With the slide valve 80 in application position, a port 217 in the valve establishes communication from the valve chamber 81 to the valve chamber 73 through which fluid under pressure supplied to the valve chamber 81 from the main reservoir 54 by way of pipes 84, 83 and pipe and passage 82 flows to the valve chamber 73. Fluid thus supplied to the chamber 73 flows therefrom to the piston chamber 154 of the relay valve device 56 through passage 75, pipe 77, valve chamber 76 in the regulating valve device 29, past the unseated supply valve 137 and its fluted stem 136, through chamber 129, and passages and pipe 155.

Fluid under pressure thus supplied to the piston chamber 154 causes the relay piston 156 and its stem 157 to move inwardly, shifting the slide valve 158 to a position to lap a port 218 leading from the seat of the slide valve to the atmosphere. After the port 218 is thus lapped, the inner end of the relay piston stem 157 engages the projection 166. The piston continues to move inwardly and the stem, due to its engagement with the projection 166, causes the valve 164 to be unseated against the opposing pressure of the spring 162 and the pressure of fluid in the spring chamber 163. With the valve 164 thus unseated, fluid under pressure flows from the main reservoir 54 to the locomotive and tender brake cylinders 57 and 58 respectively through pipe and passage 84, passage 165, past the unseated valve 164, through chamber 159 and passage and pipes 160, thus effecting an application of the locomotive and tender brakes.

When a service reduction in brake pipe pressure is effected as before described, the fluid pressure brake equipments on the cars of the train will operate in the usual manner to apply the car brakes.

From the foregoing description it will be noted that, in effecting an application of the brakes on the train, the hold-back valve device 55 functions to delay the application of the locomotive and tender brakes for a predetermined period of time after the brake pipe reduction is initiated, which period of time is governed by the blow-down time of the timing reservoir 122 and the connected diaphragm chamber 111 through the passage of the choke plug 209. In service it has been found that on a long train the train slack will gather within a period of approximately fifteen seconds after the brake pipe reduction is initiated, so that the volumes of the timing reservoir 122 and the diaphragm chamber and the flow area of the passage through the choke plug will be so proportioned as to provide for the delay of about fifteen seconds between the initiation of the brake pipe reduction and the application of the locomotive and tender brakes. If it should be desired to increase the duration of the delay period, the choke plug 209 may be removed from the casing and another having a passage of lesser flow area substituted and if it should be desired to decrease the duration of the period, a choke plug having a passage of greater flow area may be substituted. Instead of removing and replacing choke plugs as just described, a timing control valve device, such as is shown and described in the joint application of Ellis E. Hewitt and myself, filed February 24, 1931, Serial No. 517,660, may be employed.

Since in effecting an application of the brakes on the train, the brake pipe reduction is first effective on the cars at the head end of the train and since, as a consequence, the brakes apply serially from the front end of the train toward the rear end, the locomotive and tender due to their inertia, will exert a forward pull on the front end of the train during the period of time the application of the locomotive and tender brakes is delayed and thus tend to keep the slack in the train pulled out, thereby preventing excessive shocks due to the running in of the train slack.

If, when the locomotive brakes are applied, the deceleration of the locomotive is at a more rapid rate than that of the cars at the front end of the train, the front car of the train will tend to run in on the rear end of the tender. When the first car does start to thus run in, the shock absorbing mechanism 2 on the tender acts, through the medium of the yoke 4 and draft key 5, to move the coupler 3 inwardly, i. e., in the direction toward the right hand, relative to the draft sills of the tender. The coupler 3 as it thus moves operates the member 23 to force the plunger rod 44 on the tender inwardly relative to the draft sills 1, actuating the cam operating arm 43, shaft 37 and cam 36 in a clockwise direction so as to relieve the cam pressure on the piston 31 of the control device 28 and consequently on the liquid in the chambers 40 and 41 of the control device and the regulating valve device 29 respectively. With the pressure of the liquid in the chamber 41 acting on one side of the plunger piston 142 thus relieved, the spring 139 of the regulating valve device will expand and force the plunger piston outwardly, displacing some of the fluid in the chamber 41 into the pipe connection 42 and chamber 40 of the control device 28, the fluid in chamber 30 acting on the piston 31 to move it toward the left hand so as to maintain the roller 34 in operative engagement with the cam 36. It will here be noted that degree of expansion of the spring 141 is proportional to the rotation of the cam 36.

The partial expansion of the spring 141 results in the partial relief of the spring pressure on one side of the regulating piston 127 and due to this, the pressure of fluid in the chamber 129 as supplied from the main reservoir 54 by the application portion of the distributing valve device 48, causes the piston to move upwardly against the opposing adjusted pressure of the spring 141. As the regulating piston thus moves, the stem 128 thereof moves out of engagement with the stem 136 of the supply valve 137, permitting the spring 138 to act to seat the valve to close off the further supply of fluid under pressure to the chamber 129. After the supply valve 137 is thus seated, the piston stem 128 engages the head 135 on the stem of the exhaust valve 130 and by this means unseats the exhaust valve.

With the exhaust valve 130 unseated, fluid under pressure flows from the chamber 129 in the regulating valve device 29 and connected piston chamber 154 in the relay valve device 56 to the atmosphere by way of chamber 173, pipe 171, cavity 170 in the cut-out valve device 59, pipe 172, cavity 174 in the rotary valve 97 of the independent brake valve device 50 and atmospheric passage 175.

When fluid under pressure is thus vented from the relay piston chamber 154, the pressure of fluid in the relay valve chamber 159 causes the relay piston 156 to move to its extreme left hand position as shown in Fig. 5. As the piston is being moved to this latter position, the stem 157 thereof is moved out of engagement with the projection 166 of the piston valve 161, permitting the spring 162 to act to move the piston valve so as to seat the valve 164, after which the relay slide valve 158, which is shifted by the piston stem 157, uncovers the passage 218 which is open to the atmosphere.

With the valve 164 seated, the flow of fluid under pressure from the main reservoir 54 to the relay slide valve chamber 159 and brake cylinders 57 and 58 is closed off and with the passage 218 uncovered, fluid under pressure is released to the atmosphere by way of pipe and passage 160, valve chamber 159 and passage 218, thus initiating the release of the locomotive and tender brakes with the result that the retarding action of the brakes on the locomotive and tender is decreased. The release of fluid under pressure from the brake cylinders 57 and 58 will continue so long as the first car of the train continues to run in on the tender.

Now when the retarding action of the locomotive and tender brakes is such that the locomotive and tender move forwardly relative to the first car of the train, the cam 36 will be caused to rotate in a counter-clockwise direction and will, due to such movement, force the piston 31 of the control device 28 inwardly, thereby displacing some of the liquid in the chamber 40 and pipe connection 42 into the chamber 41. This causes the plunger piston to move downwardly and compress the regulating spring 141, thus increasing the pressure of the spring on one side of the piston. The spring 141 now acts to move the piston 127 and its stem 128 downwardly, first permitting the exhaust valve 130 to seat and then unseating the supply valve 137. With the supply valve again unseated, fluid under pressure is again supplied from the application portion of the distributing valve device 48 to the relay piston chamber 154 which causes the relay piston 156 and valves controlled thereby to operate to again supply fluid under pressure from the main reservoir 54 to the brake cylinders 57 and 58.

To limit the degree of reduction in brake pipe pressure, the rotary valve 86 of the automatic brake valve device is rotated from service position to lap position closing off the further exhaust of fluid under pressure from the equalizing piston chamber 90 of the brake valve device 49. After the reduction in the pressure of fluid in chamber 90 is thus stopped, the brake pipe pressure in chamber 93 continues to reduce until it becomes substantially equal to or slightly less than the pressure of fluid in the chamber 90, at which time the equalizing piston 89 acts to seat the discharge valve 95 in the usual manner. With the valve 95 thus seated, the further reduction in brake pipe pressure is prevented.

The control piston 100 and auxiliary slide valve 108 will remain in their right hand or application position until such time as the pressure of fluid in the connected control valve chamber 103, reservoir 105 and equalizing piston chamber 62 of the distributing valve device 48 has been reduced through the medium of the timing portion of the hold back valve device, to a degree slightly less than the reduced brake pipe pressure in the control piston chamber 101. When the pressure of fluid in the control valve chamber 103 is thus reduced, the higher brake pipe pressure in the control piston chamber 101 causes the control piston 100 to move in the direction toward the left hand, shifting the slide valve 108 to lap the port 206 in the main slide valve 107, thus preventing the further reduction in the pressure of fluid in the control valve chamber 103, reservoir 105 and equalizing piston chamber 62.

Now, when the pressure of fluid in equalizing valve chamber 63 of the distributing valve device reduces into the application piston chamber 78 by way of port 212 in the main slide valve 64 of the equalizing portion, passages 197 and 196 and into the chamber 215, through passage 197, cavity 213 in said slide valve and passage 214 to a degree slightly less than the pressure of fluid in the piston chamber 62, the pressure of fluid in this chamber 62 causes the piston 61 to move to shift the auxiliary valve 65 to lap the passage 212, thereby limiting the degree of pressure obtained in the application piston chamber 78.

When the pressure of fluid flowing to the chamber 74, which is between the application piston 69 and baffle piston 71 by way of passage 75 is slightly greater than the pressure of fluid in the application piston chamber 78, the application piston is shifted in a direction toward the right hand, shifting the slide valve 80 to lap position, thus closing off the further flow of fluid under pressure from the valve chamber 81 to the application valve chamber 76 of the regulating valve device 29 and relay piston chamber 154. When the brake cylinder pressure in the relay valve chamber 159 is slightly greater than the pressure of fluid in chamber 154, the relay piston 156 will move to lap position, in which the valve 164 will be caused to seat and close off the further supply of fluid under pressure from the main reservoir to the brake cylinders 57 and 58, the slide valve 158 preventing the flow of fluid under pressure from the brake cylinders to the atmosphere. Thus it will be seen the degree of brake cylinder pressure is limited.

If, when the several parts of the relay valve device are in their lap position, the first car should start to run in on the tender, the regulating valve device will be caused to operate to reduce the pressure of fluid in the relay piston chamber 154. Should the pressure of fluid in this chamber be thus reduced, the relay piston and slide valve 158 will move to their release position, as shown in Fig. 5 and fluid under pressure will be discharged from the brake cylinders 57 and 58 to the atmosphere by way of pipe and passage 160, relay slide valve chamber 159 and passage 218 in accordance with the degree of reduction in the chamber 154.

It will here be noted that after the hold-back valve device has operated to permit the application of the locomotive and tender brakes, the regulating valve device will function according to the relative movement between the first car of the train and the tender to cause the relay valve device 56 to operate to either increase or decrease the pressure of fluid in the locomotive and tender brake cylinders 57 and 58 respectively, until such time as the several parts of the system are in lap position, as before described and then cause the relay valve device to operate to release fluid under pressure from the brake cylinders, all in such a manner that the locomotive and tender will not act to retard the forward motion of the cars.

As the train is being brought to a stop the pressure of fluid in the locomotive and tender brake cylinders 57 and 58 is reduced by the action of the regulating valve device 29, and it may be that the consequent reduced braking power of the locomotive and tender brakes will be insufficient to hold the locomotive and tender against movement relative to the cars of the train, especially when the train is being operated on either an ascending or descending grade. To insure an application of the brakes with sufficient force as to hold the locomotive and tender stationary when the train is stopped, the engineer at or about the time the train comes to a stop, rotates the rotary valve 97 of the independent brake valve device 50 to application position, in which fluid at reducing valve pressure flows from the valve chamber 96 of the brake valve device 50 to the relay piston chamber 154 by way of a port 219 in the rotary valve 97, pipe 172, a passage 220 in the casing of a check valve device 221, past a ball check valve 222 mounted in said casing, a passage and pipe 223 and passage 155. Fluid under pressure thus supplied to the chamber 154 causes the several parts of the relay valve device 56 to operate to application position to supply fluid under pressure to the brake cylinders 57 and 58. It will thus be seen that the locomotive and tender brakes may be applied without regulation by the regulating valve device 29.

If the rotary valve 86 of the automatic brake valve device is turned to emergency position, a cavity 224 in the rotary valve connects the brake pipe passage 94 directly to the passage 203 leading to the atmosphere which permits a sudden reduction in brake pipe pressure to occur to effect an emergency application of the brakes on the train.

This sudden reduction in brake pipe pressure is of course effective throughout the length of the train and is also effective in the control piston chamber 101 of the hold-back valve device 55. When the pressure of fluid in the control piston chamber 101 is thus reduced, the pressure of fluid in the control valve chamber 103 causes the control piston 100 and control slide valves 108 and 107 to move to their right hand or application position, in which the timing portion of the hold-back valve device is caused to operate to effect the operation of the several parts of the distributing valve device to supply fluid under pressure to the supply valve chamber 76 of the regulating valve device 29 in substantially the same manner as described in connection with the effecting of a service application of the brakes.

In effecting an emergency application of the brakes, fluid under pressure is completely vented from the control piston chamber 101 of the hold-back valve device 55, so that the control piston and slide valves 108 and 107 remain in their extreme outer position in which fluid under pressure is completely vented from the equalizing piston chamber 62, volume reservoir 105 and control valve chamber 103 of the hold-back valve device at a service rate through port 206 in the slide valve 107, passage 125, timing slide valve chamber 112 and choke plug 113.

After the pressure of fluid in the pressure chamber 67 and valve chamber 63 of the equalizing portion of the distributing valve device 48 equalizes into the application piston chamber 78 and application chamber 215, and the pressure of fluid in the equalizing piston chamber 62 reduces below the equalized pressure in chamber 63, the equalizing piston 61 and slide valves operated thereby move to their extreme right hand or emergency position against the opposing pressure of the spring-pressed stop 211.

With the rotary valve 86 of the automatic brake valve device in emergency position, a restricted port 225 in the valve connects the rotary valve chamber 85 to a passage 226, which permits fluid under pressure to flow at a limited rate from said chamber to the seat of the slide valve 115 of the hold-back timing portion, through passages and pipe 226. When the slide valve 115 is in its right hand position for venting fluid under pressure from the equalizing piston chamber 62, fluid under pressure flows from passage 226 to the application piston chamber 78 through a cavity 227 in the slide valve 115, a passage and pipe 228, a pipe and passage 197 and a passage 196. At the same time as fluid under pressure is thus being supplied to the piston chamber 78, fluid under pressure is also being supplied, as before described, to the chamber from the pressure chamber 67 and the equalizing valve chamber 63. This additional supply of fluid from the rotary valve chamber 85 increases the rate of build up in fluid pressure in the piston chamber 78 and maintains the pressure in said chamber against leakage.

It will be noted that fluid under pressure is now supplied to the supply valve chamber 76 of the regulating valve device 29 and that said regulating valve device will function according to relative movement between the first car of the train and the tender to effect the operation of the relay valve device 56 to either increase or decrease the pressure of fluid in the brake cylinders 57 and 58.

To release the brakes after an application has been effected, the rotary valve 97 of the independent brake valve device 50 is turned to running position and the rotary valve 86 of the automatic brake valve device is turned first to release position and then to running position to charge the brake pipe 53 by way of the brake pipe passage and pipe 94 as before described in connection with the initial charging of the system. Fluid under pressure thus supplied to the pipe 94 flows to the control piston chamber 101, causing the control piston to operate to shift the control slide valves 107 and 108 to their normal or release position as shown in Fig. 5. With the control piston in release position, fluid under pressure is again supplied from the piston chamber 101 to the control valve chamber 103 through passage 187, choke 188, passage 189, past the ball check valve 190 and through passage 191.

Fluid under pressure also flows from the passage 187 to the diaphragm chamber 111 in the timing portion of the hold-back valve device 55 through the choke 192, passage 193, cavity 194 in the main slide valve 107 of the control portion, and passage 118, and from the passage 118 fluid under pressure flows to the timing reservoir 122 through the passage 120 in the plug valve 119 and passage 121. Fluid under pressure thus supplied to the diaphragm chamber 111 causes the diaphragm 110 to flex to its normal position, as shown in Fig. 5, shifting the slide valve 115 to its normal position.

Fluid under pressure supplied to the control valve chamber 103 flows through the passage 104 to the volume reservoir 105 and from said reservoir flows to the equalizing piston chamber 62 in the distributing valve device 48 through passages and pipe 106. Fluid under pressure thus supplied to the equalizing piston chamber 62 causes the equalizing piston 61 to move and shift the slide valves 65 and 64 to release position. With the equalizing piston in release position, fluid under pressure flows from the piston chamber 62 to the valve chamber 63 through the feed groove 192 which has been uncovered by the piston and fluid under pressure from the chamber 63 flows to the pressure chamber 67 by way of passage 68.

With the equalizing slide valve 64 in release position, fluid under pressure is vented from the piston chamber 78 in the application portion of the distributing valve device 48 by way of passages 196 and 197, cavity 198 in the slide valve, passage and pipe 199, cavity 200 in the rotary valve 97 of the independent brake valve device 50, passage and pipe 201, cavity 202 in the rotary valve 86 of the automatic brake valve device 49 and atmospheric passage 203. With the piston chamber 78 thus vented, fluid under pressure in chamber 74 causes the application piston 69 to move outwardly, shifting the slide valves 72 and 80 to their release position. With the slide valve 80 in release position, the flow of fluid from the valve chamber 81 to the valve chamber 73 is closed off. With the slide valve 72 in release position, fluid under pressure is vented from the relay piston chamber 154 to the atmosphere by way of passage 155, pipe 223, valve chamber of the check valve device 221, passage and pipe 229, past a ball check valve 230 of a check valve device 231, a passage and pipe 232, pipe 77, passage 75, valve chamber 73 and atmospheric passage 216.

With the relay piston chamber 154 thus vented, fluid at brake cylinder pressure present in relay valve chamber 159 causes the relay piston to move to its extreme left hand position, permitting the valve 164 to seat and close off the supply of fluid from the main reservoir to the brake cylinders 57 and 58 and shifting the relay slide valve to release position, in which fluid under pressure flows from the brake cylinders to the atmosphere by way of pipe and passage 160, relay valve chamber 159 and passage 218, thus releasing the locomotive brakes.

Upon the charging of the brake pipe, the brake equipments on the cars will function in the usual manner to release the car brakes.

Now when the brakes are released and the engine moves forward in starting the train, the regulating valve device 29 will again be adjusted in the same manner as before described in connection with the starting of the train.

If for any reason it should be desired to render the regulating valve device ineffective to control the operation of the relay valve device 56, the valve 168 of the cut-out valve device 59 is turned from the position in which it is shown in Fig. 5 to the position in which it is shown in Fig. 6. With the valve 168 in this latter position and the application portion of the distributing valve device 48 in application position, fluid under pressure flows from the valve chamber 73 to the relay piston chamber 154 through passage 75, pipe 77, pipe and passage 232, ball check valve chamber in the check valve device 231, a passage and pipe 233, a cavity 234 in the cut-out valve 168, passages and pipe 235, passage and pipe 229, ball check valve chamber of the check valve device 221 and passage and pipe 223. Fluid under pressure thus supplied to the relay piston chamber 154 causes the relay piston 156 to move to its extreme right hand or application position, in which fluid under pressure is supplied to the brake cylinders 57 and 58 as before described. It will be noted that the cut-out valve, when in its cut-out position, closes communication between the pipe and passage 171, leading from the chamber 173 in the regulating valve device 29, and the passage and pipe 172 which is open to the atmosphere through the independent brake valve device 50, so that if the regulating exhaust valve should be unseated due to relative movement between the first car of the train and the locomotive, no reduction in the pressure of fluid in the relay piston chamber will occur, with the result, that the several parts of the relay valve device will remain in application position until such time as brake cylinder pressure in the relay valve chamber 159 is sufficient to cause the relay piston to move to lap position. It will thus be seen that the regulating valve device 29 as it is adjusted in accordance with the relative movement between the first car of the train and the tender will have no regulating effect upon the operation of the relay valve device 56.

If for any reason it is desired to render the hold-back valve device 55 ineffective to delay the operation of the distributing valve device to supply fluid under pressure to the supply valve chamber 76 of the regulating valve device 29, the plug valve 119 is turned from cut-in position as shown in Fig. 5 to cut-out position. With the plug valve in cut-out position, communication between the timing reservoir 122 and the diaphragm chamber 111 of the timing portion is closed and passage 125 is open to the atmosphere through the passage 124 in the plug valve and passage 126.

If a service application of the brakes is initiated while the plug valve 119 is in cut-out position, the control piston 100 and slide valves 107 and 108 move toward application position upon a reduction in brake pipe pressure. When the slide valves are thus moved, the equalizing piston chamber 62 in the distributing valve device, volume reservoir 105 and control valve chamber 103 are open to the atmosphere through port 206 in the slide valve 107, passage 125, passage 124 in the plug valve 119 and passage 126. Further, with the slide valve 107 moved toward application position, the diaphragm chamber 111 in the timing portion of the hold-back valve device is operated to the atmosphere through passage 118, cavity 207 in the slide valve 107, passage 208 and choke plug 209.

Since the timing reservoir 122 is no longer in communication with the diaphragm chamber 111, said chamber is now quickly relieved of fluid pressure and the spring-pressed member 116 acts through the medium of the stem 114 to shift the slide valve 115 to application position, in which fluid under pressure flows from passage 125 to the atmosphere by way of the timing valve chamber 112 and choke plug 113. Thus fluid under pressure vented by way of passage 125 is free to flow to the atmosphere by way of the passage in the plug valve 119 and passage 126 and also through the choke plug 113.

It will here be noted that since the rate at which the pressure of fluid in the equalizing piston chamber 62 reduces upon a service rate of reduction in brake pipe pressure is no longer controlled by means of the choke plug 113, the control piston will not move to its extreme right hand position but will come to a stop when the main slide valve 107 has opened the passage 125 an amount only sufficient to permit the pressure of fluid in the equalizing piston chamber to reduce at substantially the same rate as the brake pipe pressure in the control piston chamber 101 is being reduced. As a result, the several parts of the distributing valve device will operate, as before described, to control the supply of fluid under pressure to the supply valve chamber 76 of the regulating valve device 29.

Upon effecting a sudden reduction in brake pipe pressure, with the plug valve 119 in cut-out position, the fluid under pressure in the control valve chamber 103 causes the control piston 100 and the slide valves 107 and 108 controlled thereby to move to their extreme outer or application position, in which the main slide valve 107 fully opens the passage 125 and permits a sudden reduction to occur in the pressure of fluid in the equalizing piston chamber 62.

The equalizing portion now functions to supply fluid under pressure to the application piston chamber 78, causing the application portion to operate to supply fluid under pressure to the supply valve chamber 76 in the regulating valve device 76 in the same manner as before described in connection with an emergency application of the brakes.

To effect a release of the brakes after an application of the brakes has been effected with the plug valve 119 to cut-out position, the brake pipe 53 is recharged, causing the several parts of the equipment to operate in substantially the same manner as before described in connection with the release of the brakes with the plug valve 119 in cut-in position.

If it should be desired to cut out the hold-back feature and the regulating feature, both the plug valve 119 and the valve 168 are turned to their cut-out position. When these valves are in their cut-out position and a reduction in brake pipe pressure is made to effect an application of the brakes, the application piston will be caused to move to application position by the operation of the hold back valve device 55 in the same manner as before described and fluid under pressure is supplied from the valve chamber 81 to the relay piston chamber 154 by way of the port 217 in the slide valve 80 of the application portion of the distributing valve device 48, valve chamber 73, passage 75, pipe 77, pipe and passage 232, ball check valve chamber in the check valve device 231, passage and pipe 233, cavity 234 in the cutout valve 168, passages and pipe 235, passage and pipe 229, ball check valve chamber of the check valve device 221 and passage and pipe 223. Fluid under pressure thus supplied to the relay piston chamber 154 causes the relay piston 156 and other parts of the relay valve device to operate to supply fluid under pressure to the brake cylinders 57 and 58 without regulation by the regulating valve device 29.

To release such an application of the brakes the brake pipe 53 is recharged, causing the several parts of the hold-back valve device and of the distributing valve device to move to their release position as shown in Fig. 5. With the application portion of the distributing valve device in relase position, fluid under pressure is vented from the relay piston chamber 154 to the atmosphere by way of pipe and passage 223, ball check valve chamber in the check valve device 221, pipe and passage 229, past the ball check valve 230, through passage and pipe 232, pipe 77, passage 75, valve chamber 73 in the distributing valve device and atmospheric passage 216. With fluid under pressure thus vented from the piston chamber 154, the relay valve device operates to vent fluid under pressure from the brake cylinders 57 and 58 in the same manner as before described.

When it is desired to effect an application of the locomotive and tender brakes only the rotary valve 97 of the independent brake valve device is rotated to application position in which fluid at reducing valve pressure flows from the rotary valve chamber 96 to the application piston chamber 78 in the distributing valve device 48 by way of the port 219 in the rotary valve, passage and pipe 197 and passage 196 and also flows to the relay piston chamber 154 by way of the port 219, passage and pipe 172, passage 220 in the check valve device 221, past the ball check valve 222, passage and pipe 223 and passage 155. Fluid under pressure thus supplied to the piston chamber 78 causes the application piston 69 to move to its innermost or application position, shifting the slide valve 72 to close the exhaust passage 216 and shifting the slide valve 80 to establish communication through which fluid under pressure is supplied from the valve chamber 81 to the supply valve chamber 76 in the regulating valve device 29. Fluid under pressure supplied to the relay piston chamber 154 causes the several parts of the relay valve device to operate to supply fluid under pressure to the brake cylinders 57 and 58 as before described. Now when the pressure of fluid in the chambers 73 and 74 in the distributing valve device is substantially equal to the pressure of fluid in the piston chamber 78, the spring pressed plunger 236 acts to move the piston 69 and thereby the slide valve 80 to lap position in which the flow of fluid from the chamber 81 to the chamber 73 is cut off. When the brake cylinder pressure in chamber 159 of the relay valve device is slightly greater than the pressure of fluid supplied to piston chamber 154, the piston will move to lap position, permitting the valve 164 to seat, thereby closing off the further flow of fluid under pressure to the brake cylinders 57 and 58. It will here be noted that since the pipes 171, 172 and 77 are each charged with fluid under pressure, the regulating valve device, if it should be caused to operate, will in no way regulate the operation of the relay valve device 56.

To release an independent application of the brakes, the rotary valve 97 is turned either to release or running position. In release position fluid under pressure is vented from the application piston chamber 78 of the distributing valve device to the atmosphere by way of passage 196, passage and pipe 197, a cavity 237 in the rotary valve and passage 175. With the piston chamber 78 thus vented, fluid under pressure in chambers 73 and 74 cause the piston 69 and consequently, the slide valves 72 and 80 to move to release position, in which fluid under pressure is released from the relay piston chamber 154 by way of passage 155, pipe and passage 223, ball check valve chamber in the check valve device 221, pipe and passage 229, past the ball device 221, pipe and passage 229, past the ball check valve 230, passage and pipe 232, pipe 77, passage 75 in the distributing valve device 48, valve chamber 73 and passage 216. In running position, fluid under pressure is vented from the application piston chamber 78 by way of passages 196 and 197, cavity 198 in the main slide valve 64 of the equalizing portion, passage and pipe 199, cavity 200 in the rotary valve 97 of the independent brake valve device, pipe and passage 201, cavity 202 in the rotary valve 86 of the automatic brake valve device and passage 203. Fluid under pressure is vented from the relay piston chamber 154 in the same manner as when the brake valve device is in release position.

The ball check valve 230 is for the purpose of preventing the flow of fluid under pressure from the pipe 77 to the relay piston chamber 154 by way of pipe and passage 232, passage and pipe 229, check valve device 221, pipe 223 and passage 155, thus preventing the by-passing of fluid around the regulating valve device 29 when the cut-out valve device 59 is in cut-in position.

The ball check valve 222 is for the purpose of preventing fluid under pressure from being vented from the relay piston chamber 154 by way of passage 155, pipe 223, pipe 172, cavity 174 in the rotary valve 97 of the independent brake valve device and passage 175 when the rotary valve is in running position and an automatic application of the brakes is being effected, thus insuring the proper control of the relay valve device by the regulating valve device 29.

In Fig. 10 of the drawings, a modification of the invention is illustrated diagrammatically in which the regulating valve device 29 and relay valve device 56 are carried by any desired fixed part of the tender and in which the operation of the regulating device is controlled by mechanical means. In this modification the casing of the regulating valve device 29 is provided with spaced lugs 238 between which is the cam 36 which is secured to the shaft 37 journalled in the lugs 238, said cam directly engaging the outer end of the plunger 142. For varying the position of the cam, the mechanism described in connection with the equipment shown in Figs. 1, 2 and 3 may be employed.

In Figs. 11 to 13 inclusive, another modification of the invention is illustrated diagrammatically in which another form of mechanism is employed for controlling the adjustment of the regulating valve device 29. In this modification the outer end of the plunger 142 is provided with spaced lugs 239 between which a roller 240 is rotatably mounted on a pin 241 extending between and carried by said lugs, said roller being engaged by the cam surface 35 of the cam 36.

For rotating the cam 36 I provide a rotatable flexible connection which may be in the form of axially aligned shafts 242 and 243 which are operatively connected together between the tender and locomotive by means of a universal connection device 244 which permits universal movement of the shafts relative to each other. The shaft 242, for the greater portion of its length may be round in cross section and may be journalled in fixed parts 245 and 246 of the locomotive. The free end 247 of this shaft is square in cross section and extends through a correspondingly shaped hole in the cam 36, said cam being slidable along the square portion 247 of the shaft by the engagement of the part 246 of the locomotive when there is relative longitudinal movement between the tender and locomotive. The shaft 243 is round in cross section for the greater part of its length and may be journalled in fixed parts 248 and 249 of the tender. Secured to the outer end of the shaft is a bevelled gear wheel 250, the teeth of which mesh with the teeth of a bevelled gear wheel 251 which is secured to the outer end of a transversely extending rotatable shaft 252 which is journalled in the lugs 22 carried by the tender underframe. The shaft 252 is adapted to be rotated in one direction by the member 23 which is disposed between the lugs 22 and which is secured to the shaft. Surrounding the shaft 243 and interposed between and anchored to the part 249 and a collar 253 secured to the shaft is a torsion spring 254 which at all times tends to rotate the flexible connection in the direction as indicated by the arrow in Fig. 13.

In operation, when the tender is moved forwardly, that is to say in the direction toward the right hand, the torsion spring acts to rotate the flexible connection and thereby the cam 36 in the direction as indicated by the arrow in Fig. 13. When the cam is thus rotated, it forces the plunger 142 inwardly compressing the spring 141, thereby increasing the spring pressure on the piston 127. As the flexible connection is thus rotated, the bevelled gear wheel 250 secured to the outer end thereof drives the bevelled gear wheel 251 and consequently the shaft 252 and member 23 in a clockwise direction, thus the edge 25 of the member 23 is maintained in operative engagement with the rear face 26 of the coupler horn 27. Now when the coupler 3 is moved inwardly the member 23 will be rotated in a counter-clockwise direction and through the medium of the shaft 252 bevelled gears 251 and 250 and flexible connection rotate the cam 36 in the opposite direction to that indicated by the arrow in Fig. 11, thereby permitting the spring pressure on the piston 127 to reduce.

In Fig. 14 a further modification of the invention is illustrated diagrammatically in which the regulating valve device 29 is adjusted by electrically controlled means according to the relative longitudinal movement between the first car of the train and the rear end of the tender.

As shown in Fig. 14, the electrical means may comprise a magnet device 255 which is carried by the casing of the regulating valve device 29, said magnet device comprising a winding 256, an armature 257 and an armature stem 258 having its inner end connected to the regulating piston stem 128. One end of the winding 256 is connected to a switch contact 259, which is adapted to be connected to an adjacent switch contact 260 connected to one terminal of a battery 261 or other source of electrical energy.

The other end of the winding 256 is connected to one end of a resistance element 262 with which a contact member 263, connected to the other terminal of the battery 261, is in constant contact. The contact member 263 is secured to the inner end of the rod 44, there being an insulating block 264 interposed between the rod and contact member.

The circuit through the battery 261, magnet winding 256, resistance element 262, and contact member 263 is normally open as shown and is adapted to be closed by a contact plate 265 when said plate is moved into contact with the switch contacts 259 and 260.

For controlling the operation of the contact plate 265, a piston device 266 is provided which comprises a casing containing a piston 267 having a stem 268 to which the contact plate is secured, it being understood that there will be an insulating medium between the plate and the stem. At one side of the piston 267 is a chamber 269 which is in constant communication through a passage and pipe 270 with the pipe 77 which is constantly connected to the valve chamber 73 in the distributing valve device 48 and with the valve chamber 76 in the regulating valve device 29.

When in effecting an application of the brakes, fluid under pressure is supplied through the pipe 77 to the valve chamber 76 in the regulating valve device 29, fluid under pressure flows through pipe and passage 270 to the piston chamber 269 and causes the piston to move outwardly against the opposing pressure of a spring 271 moving the contact plate 265, through the medium of the piston stem 268, into contact with the switch contacts 259 and 260. Thus the circuit through the battery 261, magnet winding 256, resistance element 262 and contact 263 is closed.

Now if the tender coupling mechanism is subjected to maximum draft strain, the coupler 3 will be in the position shown, and with the coupler in this position, the contact member 263 will be in its extreme outer position in which the maximum resistance is cut in the magnet circuit. With the maximum resistance thus cut in, the winding 256 will be energized, but not sufficiently to move the piston 127 against the opposing pressure of the spring 141. The spring 141 is of such a value that even with the winding thus energized, the piston 127 will not move outwardly to permit the valve 137 to seat and close off the further supply of fluid under pressure to the relay piston chamber. If however, the coupler 3 is moved inwardly, the contact member 263 will be shifted to cut out some of the resistance in the circuit, so that the magnetic pull on the armature 257 and consequently on the piston is increased. The pressure of fluid in the chamber 129, together with the magnetic pull of the armature causes the piston 127 to move upwardly against the opposing pressure of the spring 141, permitting the supply valve 137 to seat and unseating the exhaust valve 130. With the exhaust valve unseated, fluid under pressure is vented from the relay piston chamber 154, which permits the relay valve device 56 to operate to release fluid under pressure from the brake cylinders 57 and 58. If when fluid under pressure is thus released from the brake cylinders, the locomotive and tender should move forward relative to the first car of the train, more resistance will be cut in circuit and the magnetic pull on the armature 257 will be decreased, with the result that fluid under pressure will again be supplied to the brake cylinders 57 and 58. It will thus be seen that the regulating valve device is adjusted electrically according to the relative longitudinal movement between the first car of the train and the tender.

When, in releasing the brakes on the train, fluid under pressure is vented from the pipe 77 and consequently from the pipe 270 and piston chamber 269 in the piston device 266, the spring 271 which has been compressed acts to move the piston 267 inwardly by thereby moving the contact member 265 out of engagement with the switch contacts 259 and 260 opening the circuit through the magnet winding 256 and permits the regulating valve device to operate to unseat the valve 137.

If for any reason the magnet winding 256 would not be energized when fluid under pressure is supplied to the pipe 77 in effecting an application of the brakes, an application of the locomotive and tender brakes will be effected, since the valve 137 is normally maintained unseated.

In Fig. 15 a still further modification of the invention is illustrated diagrammatically in which a regulating valve device 272 is employed, which in construction differs from the regulating valve device 29 of each of the before described forms of the invention, and in which the regulating valve device 272 is adjusted by electrically controlled means in accordance with the relative longitudinal movement between the first car of the train and the rear end of the tender.

The regulating valve device may comprise a casing which supports a magnet device 273 comprising a winding 274, an armature 275 and an armature stem 276. One end of the winding is connected to the switch contact 259 and the other end is connected to a resistance element 277 which is constantly engaged by the contact member 263 secured to the inner end of the rod 44, said contact member being connected to one terminal of the battery 261. The opposite terminal of the battery is connected to the switch contact 260 which is adjacent the switch contact 259.

As shown, the control circuit is normally opened and is adapted to be closed when the contact member 265 is moved into contact with the switch contacts. For controlling the operation of the contact plate 265, a piston device 266 is provided which is identical with the corresponding device described in connection with Fig. 14.

Mounted in the casing of the valve device 272 is a flexible diaphragm 278 at one side of which is a chamber 279 constantly open to the exhaust passage 171 and at the other side is a chamber 280 which is constantly connected to the relay piston chamber 154 of the relay valve device 56 through passage and pipe 155.

The lower end of the armature stem 276 is enlarged and extends through and is clamped to the flexible diaphragm 278 by a nut 281. Leading from the inner end of the enlarged portion of the armature stem to a passage 282 open to the chamber 279, is a central bore 283, which as shown is normally closed by an exhaust valve 284 contained in the diaphragm chamber 280. The inner end of the stem of the valve 284 is engaged by the end of the fluted stem of a supply valve 285 contained in a supply chamber 286 open to passage and pipe 77. Contained in the chamber 286 and engaging the supply valve 285 is a spring 287 which tends to seat the valve. Contained in the chamber 279 and interposed between the casing and engaging the enlarged portion of the armature stem 276 is a spring 288, which acts to normally maintain the exhaust valve closed and the supply valve 285 open against the opposing pressure of the spring 287.

When fluid under pressure is supplied to the pipe 77 in effecting an application of the brakes, the piston device 266 operates to move the contact member 265 into circuit closing position as before described in connection with the operation of the equipment shown in Fig. 14.

Now, if the tender coupling mechanism is subjected to maximum draft strain, the coupler 3 will be in the position shown. With the coupler in this position, the contact member 263 will be in its extreme outer position, in which the minimum amount of resistance is cut in the magnet circuit. With the minimum amount of resistance thus cut in, the magnet armature 275 is caused to exert pressure on the valve 285 through the medium of the armature stem and valve 284. Fluid under pressure supplied to the valve chamber 286 flows to the relay piston chamber past the unseated valve 285, through chamber 280 and passage and pipe 155, causing the relay valve device to operate to supply fluid under pressure to the brake cylinders 57 and 58, thus effecting an application of the brakes.

If when the brakes are applied, the first car of the train moves toward the locomotive, the rod 44 and contact member 263 will be moved inwardly, as will be understood from the description of the other forms of the invention, cutting more resistance in the magnet circuit, which results in the reduction of the magnetic pull on the armature. With the magnetic pull on the armature thus reduced, fluid under pressure in the chamber 280 causes the diaphragm 278 to be flexed outwardly, permitting the supply valve 285 to be seated by the action of the spring 287. After the valve 285 is seated, the diaphragm continues to flex outwardly, moving the armature stem out of seating engagement with the exhaust valve 284, so that fluid under pressure is now vented from the relay piston chamber by way of pipe and passage 155, diaphragm chamber 280, past the valve 284, through bore 283, passage 282, chamber 279 and passage and pipe 71, causing the relay valve device 56 to operate to release fluid under pressure from the brake cylinders 57 and 58. Now if the locomotive should move forwardly relative to the first car of the train, the magnet winding will again be fully energized, causing the seating of the exhaust valve and the unseating of the supply valve 285. With the valve 285 unseated, fluid under pressure is again supplied to the relay piston chamber, causing the relay valve device to again supply fluid under pressure to the brake cylinders.

When, in releasing the brakes on the train, fluid under pressure is vented from the pipe 77, the piston device 266 will operate in the same manner as the corresponding device in Fig. 14 operates, thus opening the circuit through the magnet winding 274. With the circuit thus opened, the several parts of the regulating device will return to their normal positions as shown.

It will thus be seen that the regulating valve device 272 will be adjusted electrically according to relative longitudinal movement between the first car of the train and the tender.

If for any reason the magnet winding 274 would not be energized when fluid under pressure is supplied to the pipe 77 in effecting an application of the brakes, an application of the locomotive and tender brakes will be effected, since the valve 285, as before stated, is normally open.

The description and showing of the modifications of my invention has been limited to the details of the regulating mechanisms and the control means for said mechanisms, but it will be understood that the remainder of the equipment may be substantially the same in detail and operation as that shown and described in connection with the first form of the invention, with the exception that the control device 28, liquid reservoir device 68, chamber 41, necessary pipe connections between these devices and chamber and balancing spring 153 of the regulating valve device are all omitted.

It will be noted from the foregoing description that when a brake pipe reduction is initiated in effecting an application of the brakes, the hold-back valve device 55 functions to prevent the distributing valve device 48 from operating to supply fluid under pressure to the regulating valve device until after a predetermined period of time has elapsed. During this delay period the slack in the train gathers and the locomotive and tender, due to their inertia, will exert a forward pull on the cars of the train and tend to maintain the slack in the train stretched out for insuring a gentle gathering of the slack in the train. After the above mentioned delay period has elapsed, the relay valve device is caused to operate to supply fluid under pressure to the brake cylinders 57 and 58 effecting an application of the locomotive and tender brakes. Now if the retardation of the locomotive and tender is such that the first car of the train tends to run in on the tender, the mechanism which is operated according to relative longitudinal movement between the first car of the train and the tender is caused to operate to adjust the regulating device so that the regulating device will operate automatically to cause the relay valve device 56 to function to release fluid under pressure from the brake cylinders 57 and 58. Since the car brakes are not released by the action of the regulating valve device and relay valve device, the retardation of the cars may be such that the locomotive and tender will move forwardly relative to the first car of the train and if this does occur, the regulating valve device will be so adjusted as to cause the relay device to again supply fluid under pressure to the brake cylinders 57 and 58.

It will thus be seen that from the time an application of the brakes on the cars of the train is initiated until the distributing valve device operates to supply fluid under pressure to the regulating valve device, the inertia of the locomotive and tender insures the gentle gathering of the slack in the train, and that after the distributing valve device operates to supply fluid under pressure to the regulating valve device, the regulating valve device in operating in accordance with the relative longitudinal movement between the first car of the train and the tender, effects such variations in the pressure of fluid in the brake cylinders 57 and 58 as will prevent the locomotive and tender from causing run-in and run-out shocks on the cars of the train.

With the hold-back valve device 55 cut out, an application of the locomotive and tender brakes is not delayed, consequently the regulating valve device regulates the pressure of fluid in the locomotive and tender brake cylinders from the time the locomotive and tender brakes are applied until the train is substantially stopped.

In this specification, I have described my equipment as being carried by a locomotive and tender, but I do not wish to be limited to this, for it will be readily understood that the equipment may be carried by any other train power unit not having a tender such as an electrical locomotive, motor car or the like.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a fluid pressure brake system for a train of one or more cars and a power vehicle, the combination with a brake pipe, of means on the car or cars of the train operated upon a reduction in brake pipe pressure for effecting an application of the car brakes, valve means on the power vehicle operated upon said reduction in brake pipe pressure to effect an application of the power vehicle brakes, valve means operative to vary the braking power of the power vehicle brakes, and means operated hydraulically according to a relative movement between the power vehicle and an adjacent car of the train to control the operation of the last mentioned valve means to vary the braking power on the power vehicle.

2. In a fluid pressure brake system for a train of one or more cars and a power vehicle, the combination with a brake pipe, of means on the car or cars of the train operated upon a reduction in brake pipe pressure for effecting an application of the car brakes, valve means on the power vehicle operated upon said reduction in brake pipe pressure to effect an application of the power vehicle brakes, valve means operative to vary the braking power of the power vehicle brakes, and means operated electrically according to a relative movement between the power vehicle and an adjacent car of the train to control the operation of the last mentioned valve means to vary the braking power on the power vehicle.

3. In a fluid pressure brake system for a train of one or more cars and a power vehicle, the combination with a brake pipe, of means on the car or cars of the train operated upon a reduction in brake pipe pressure for effecting an application of the car brakes, a brake cylinder on the power vehicle, a valve device operative by fluid under pressure for supplying fluid under pressure to said brake cylinder and operative upon a reduction in the pressure of fluid thus supplied to release fluid under pressure from said brake cylinder, valve mechanism operated upon said reduction in brake pipe pressure for supplying fluid under pressure to said valve device at a predetermined time after said reduction in brake pipe pressure is initiated, and means subject to the pressure of fluid supplied by said valve mechanism and operated according to a relative movement between said power vehicle and an adjacent car of the train for varying the pressure of fluid in said valve device.

4. In a fluid pressure brake system for a train of one or more cars and a power vehicle, the combination with a brake equipment on the power vehicle operative to effect an application of the brakes on the power vehicle, means operative to vary the braking action of the brake equipment, and means controlled hydraulically according to relative movement between the power vehicle and the adjacent car of the train for controlling the operation of the first mentioned means to vary the braking action of the brake equipment.

5. In a fluid pressure brake system for a train of one or more cars and a power vehicle, the combination with a brake equipment on the power vehicle operative to effect an application of the brakes on the power vehicle, means operative to vary the braking action of said brake equipment, and means controlled electrically according to relative movement between the power vehicle and the adjacent car of the train for controlling the operation of the first mentioned means to vary the braking action of the equipment.

6. In a fluid pressure brake system for a train of one or more cars and a power vehicle, the combination with a brake pipe, of means on the car or cars of the train operated upon a reduction in brake pipe pressure to effect an application of the car brakes, a brake cylinder on the power vehicle, valve means on the power vehicle operated upon said reduction in brake pipe pressure to supply fluid under pressure to the brake cylinder, pressure sensitive means subject to the opposing pressures of fluid and a spring for controlling the operation of said valve means to vary the pressure of fluid in the brake cylinder, and means operated according to a relative movement between the power vehicle and the adjacent car of the train for varying the pressure of said spring.

7. In a fluid pressure brake system for a train of one or more cars and a power vehicle, the combination with a brake pipe, of means on the car or cars of the train operated upon a reduction in brake pipe pressure for effecting an application of the car brakes, valve means operated upon said reduction in brake pipe pressure to effect an application of the power vehicle brakes, valve mechanism included in said valve means subject to the opposing pressures of fluid and a spring for governing the degree of braking force on the power vehicle, and means operated upon a relative movement between the power vehicle and the adjacent car of the train to regulate the pressure of said spring.

8. The combination in a train of at least two vehicles, one of which is a power vehicle, of a brake equipment on each of said vehicles, manually controlled means on the power vehicle for initiating the operation of the brake equipments on both of said vehicles to effect an application of the brakes, hydraulically controlled means operated upon a relative movement between the vehicles for regulating the braking action on the power vehicle, and means for maintaining said hydraulically controlled means filled with liquid.

9. The combination in a train of at least two vehicles, one of which is a power vehicle, of a brake equipment on each of said vehicles, manually controlled means on the power vehicle for initiating the operation of the brake equipments on both of said vehicles to effect an application of the brakes, hydraulically controlled means operated upon a relative movement between the vehicles for regulating the braking action on the power vehicle, a liquid reservoir in communication with said hydraulically controlled means, and liquid in said reservoir adapted to flow into said hydraulically controlled means to maintain the means filled with liquid.

10. The combination in a train of at least two vehicles, one of which is a power vehicle, of a brake equipment on each of said vehicles, manually controlled means on the power vehicle for initiating the operation of the brake equipments on both of said vehicles to effect an application of the brakes, hydraulically controlled means operated upon a relative movement between the vehicles for regulating the braking action on the power vehicle, a liquid reservoir in communication with said hydraulically controlled means, liquid in said reservoir adapted to be forced into said hydraulically controlled means by fluid under pressure, and means operative to prevent back flow of liquid from said hydraulically controlled means to said reservoir.

11. The combination in a train of at least two vehicles, one of which is a power vehicle, of a brake equipment on each of said vehicles, manually controlled means on the power vehicle for initiating the operation of the brake equipments on both of said vehicles to effect an application of the brakes, hydraulically controlled means operated upon a relative movement between the vehicles for regulating the braking action on the power vehicle, a liquid reservoir in communication with said hydraulically controlled means, liquid in said reservoir, a connection through which fluid under pressure is supplied to said reservoir to force said liquid into said hydraulically controlled means to maintain the hydraulically controlled means filled against leakage, said reservoir having an opening through which liquid is adapted to be supplied to the reservoir, a plug normally closing said opening, and a valve operative upon the removal of said plug for closing off the flow of fluid under pressure to said reservoir.

12. The combination in a train of at least two vehicles, one of which is a power vehicle, of a brake equipment on each of said vehicles, manually controlled means on the power vehicle for initiating the operation of the brake equipments on both of said vehicles to effect an application of the brakes, hydraulically controlled means operated upon a relative movement between the vehicles for regulating the braking action on the power vehicle, a liquid reservoir in communication with said hydraulically controlled means, liquid in said reservoir, a connection through which fluid under pressure is supplied to said reservoir to force said liquid into said hydraulically controlled means to maintain the hydraulically controlled means filled against leakage, said reservoir having an opening through which liquid is adapted to be supplied to the reservoir, a plug normally closing said opening, a valve operated upon the removal of said plug for closing off the flow of fluid under pressure to said reservoir, and a check valve for preventing back flow of fluid from the hydraulically controlled means to said reservoir.

CLYDE C. FARMER.